(12) United States Patent
Morrow et al.

(10) Patent No.: US 7,699,914 B1
(45) Date of Patent: Apr. 20, 2010

(54) TRIPLE-EFFECT ABSORPTION SYSTEM FOR RECOVERING METHANE GAS

(76) Inventors: Luke N. Morrow, 1703 N. I St., Midland, TX (US) 79705; Paul D. Morrow, 1403 Douglas Ave., Midland, TX (US) 79701; David C. Morrow, 11805 WCR 56, Midland, TX (US) 79707

( * ) Notice: Subject to any disclaimer, the term of this patent is extended or adjusted under 35 U.S.C. 154(b) by 1166 days.

(21) Appl. No.: 11/299,162

(22) Filed: Dec. 9, 2005

(51) Int. Cl.
*B01D 53/14* (2006.01)
(52) U.S. Cl. .............................. 96/234; 95/172; 95/176; 95/177; 95/199; 95/227; 95/236
(58) Field of Classification Search .................... 95/192, 95/199, 236–237, 231, 223, 172, 174, 176–177, 95/173, 208; 96/234
See application file for complete search history.

(56) References Cited

U.S. PATENT DOCUMENTS

| | | | |
|---|---|---|---|
| 2,982,721 A | 5/1961 | Dow | |
| 3,469,934 A | 9/1969 | Bocard | |
| 3,618,331 A | 11/1971 | Smith | |
| 3,767,766 A * | 10/1973 | Tjoa et al ................... | 423/220 |
| 4,000,990 A | 1/1977 | Bingham | |
| 4,080,424 A * | 3/1978 | Miller et al. ................. | 423/223 |
| 4,097,250 A | 6/1978 | Pagani | |
| 4,242,108 A * | 12/1980 | Nicholas et al. ............... | 95/166 |
| 4,270,937 A | 6/1981 | Adler | |
| 4,318,723 A | 3/1982 | Holmes | |
| 4,371,381 A | 2/1983 | Schuftan | |
| 4,417,449 A | 11/1983 | Hegarty et al. | |
| 4,449,994 A | 5/1984 | Hegarty | |
| 4,459,142 A | 7/1984 | Goddin | |
| 4,475,347 A | 10/1984 | Hegarty | |
| 4,478,798 A | 10/1984 | Karwat | |
| 4,491,566 A * | 1/1985 | Adams et al. ................ | 423/220 |
| 4,518,399 A | 5/1985 | Croskell | |
| 4,548,620 A * | 10/1985 | Albiol .......................... | 95/174 |
| 4,563,202 A | 1/1986 | Yao | |
| 4,575,387 A | 3/1986 | Larue | |
| 4,609,384 A | 9/1986 | Ranke | |
| 4,675,035 A | 6/1987 | Apffel | |
| 4,681,612 A | 7/1987 | O'Brien | |

(Continued)

OTHER PUBLICATIONS

Sherman; Morphysorb Process Application for Landfill Gas; IGT Analytical Report; Apr. 23, 1999; Des Plaines, IL.

(Continued)

*Primary Examiner*—Duane Smith
*Assistant Examiner*—Ives Wu
(74) *Attorney, Agent, or Firm*—Robert J. Harter

(57) ABSTRACT

A method of using a triple-effect absorption system to recover methane from landfill gas contaminated with $CO_2$ and trace contaminates such as chlorinated hydrocarbons and aromatics involves processing the landfill gas with three absorbers and a flash system. One absorber uses a solvent to absorb the trace contaminants from the landfill gas, the second absorber in conjunction with the flash system extracts $CO_2$ from the gas, and just a first portion of that $CO_2$ is used for stripping the trace contaminates from the solvent in the third absorber. The rest of the extracted $CO_2$ is vented to atmosphere to prevent dampening the combustion of the trace contaminants absorbed by the first portion of $CO_2$.

18 Claims, 1 Drawing Sheet

U.S. PATENT DOCUMENTS

| | | | |
|---|---|---|---|
| 4,720,294 | A | 1/1988 | Lucadamo |
| 4,747,858 | A | 5/1988 | Gottier |
| 4,749,555 | A | 6/1988 | Bush |
| 4,762,543 | A | 8/1988 | Pantermuehl |
| 4,770,676 | A | 9/1988 | Sircar |
| 4,869,894 | A | 9/1989 | Wang |
| H825 | H | 10/1990 | Green |
| 5,059,405 | A | 10/1991 | Watson |
| 5,198,001 | A | 3/1993 | Knebel |
| 5,335,504 | A | 8/1994 | Durr |
| 5,451,249 | A | 9/1995 | Spiegel |
| 5,453,210 | A | 9/1995 | Bardasz |
| 5,529,612 | A | 6/1996 | Troost |
| 5,642,630 | A | 7/1997 | Abdelmalek |
| 5,664,911 | A | 9/1997 | Bridges |
| 5,681,360 | A | 10/1997 | Siwajek et al. |
| 5,842,357 | A | 12/1998 | Siwajek |
| 5,938,819 | A | 8/1999 | Seery |
| 5,961,701 | A | 10/1999 | Hlynsky |
| 6,071,326 | A | 6/2000 | Hall |
| 6,666,908 | B2 * | 12/2003 | Cadours et al. ............... 95/166 |
| 6,929,680 | B2 * | 8/2005 | Krushnevych et al. ......... 95/93 |
| 6,945,029 | B2 | 9/2005 | Viteri |
| 6,969,562 | B2 | 11/2005 | Su et al. |

OTHER PUBLICATIONS

Dinsmore; High BTU Landfill Gas Recovery Using Pressure Swing MDEA Process; Published Paper; Aug. 18, 1998; John Zink Company; Tulsa, OK.

Koch; A New Process for the Production of Hight BTU Gas; Published Paper; Aug. 18, 1998; Air Products and Chemicals, Inc.; Allentown, PA.

Shah; Selexol Solvent Landfill Gas Treating Unit Process Design Information Package; Process Evaluation Report; Dec. 12, 1996; Process Design Services, Inc.; Akron, OH.

Wheless; Production and Utilization of Landfill Gas Derived CNG in Heavy-Duty Class 8 Trucks; Published Paper; Nov. 1996; TOPTEC; Costa Mesa, CA.

Cosulich; Converting Landfill Gas to Vehicle Fuel; Article; Jan. 1996; Natural Gas Fuels; RP Publishing; Denver, CO.

Wheless; Trash is Your Friend; Article; May 1996; Natural Gas Fuels; RP Publishing; Denver, CO.

Wehless; Converting Landfill Gas to Vehicle Fuel; Article; Jan. 1996; Natural Gas Fuels; RP Publishing; Denver, CO.

Epps; Use of Selexol Solvent for Hydrocarbon Dewpoint Control and Dehydration of Natural Gas; Presentation; Feb. 28, 1994; Norman, OK.

Maguin; Processing and Utilization of Landfill Gas as a Clean Alternative Vehicle Fuel; Paper describing facility installation; Oct. 1993; Whittier CA.

Epps; Processing of Landfill Gas for Commercial Applications; Presentation; Jun. 15, 1992; Union Carbide Chemicals and Plastics Technology Corp., Houston, TX.

Bucklin; Comparison of Fluor Solvent and Selexol Processes; AlChe Symposium; Mar. 11, 1984; AlChe; Atlanta, GA.

Judd; Gas-Process-Plant Conversion Cuts Energy Use, Emissions; Article; Oil and Gas Journal; May 8, 1978; Pennwell Publishing; Tulsa, OK.

Raney; Bulk Removal of Carbon Dioxide with Selexol at Pikes Peak Plant; Paper describing facility installation; Feb. 15, 1974; Dallas, TX.

* cited by examiner

US 7,699,914 B1

TRIPLE-EFFECT ABSORPTION SYSTEM FOR RECOVERING METHANE GAS

BACKGROUND OF THE INVENTION

1. Field of the Invention

The subject invention generally pertains to processing landfill gas and more specifically to an absorption system for recovering methane gas.

2. Description of Related Art

Decomposing garbage buried in a landfill can generate landfill gas that can be extracted and processed to provide relatively clean methane gas. Processing plants have been developed for extracting the methane and disposing of its contaminants in a responsible manner. In order to attain the full value of the methane, processing plants need to remove the contaminants efficiently and thoroughly. Otherwise, unacceptably high concentrations of the contaminants can remain in the methane, thereby decreasing its value. In some cases, certain contaminants may accumulate in the processing plant itself, which can reduce the plant's operating efficiency.

Current gas processing plants are more efficient at removing some impurities than others, so there is still a need for a better method of recovering clean methane gas from landfills.

SUMMARY OF THE INVENTION

To provide a more efficient method of recovering methane gas from a landfill, it is an object of some embodiments of the invention to use one landfill gas impurity to help extract another impurity from a solvent that is used for purifying contaminated methane.

Another object of some embodiments, is to use $CO_2$ to strip trace contaminants from a solvent that absorbed the contaminants from a landfill gas. Using $CO_2$ as a stripping agent can help prevent the accumulation of solid sulfur, which is notorious for occluding various heat exchangers and other fluid passageways.

Another object of some embodiments, is to is extract $CO_2$ from one portion of solvent, and then use that $CO_2$ to strip trace contaminants from another portion of solvent.

Another object of some embodiments, is to extract $CO_2$ from a landfill gas and use just a minimal amount of the $CO_2$ as a stripping agent but only a minimal amount of it so as not to create an unnecessarily high solvent loss or fuel gas requirements.

Another object of some embodiments is to extract $CO_2$ from a landfill gas and use only a minimal portion of the $CO_2$ to strip trace contaminants from a solvent so that the trace contaminants can be readily burned to heat the minimal portion of $CO_2$ to at least 1400° F.

Another object of some embodiments is to extract $CO_2$ from a landfill gas, vent a first portion of the $CO_2$ directly to atmosphere, and use only the remaining portion of the $CO_2$ to strip trace contaminants from a solvent so that the trace contaminants can be readily burned to heat the remaining portion of $CO_2$ to at least 1400° F.

Another object of some embodiments is to extract $CO_2$ from a landfill gas and heat a portion of the $CO_2$ to enhance its ability to absorb trace contaminants from a solvent.

Another object of some embodiments is to extract $CO_2$ from a landfill gas and heat a portion of the $CO_2$ to enhance its ability to absorb trace contaminants from a solvent, wherein the heat is generated by compressing the landfill gas.

Another object of some embodiments is to maintain the pressure in a first absorber nearly equal to or at least within 10% of the pressure in a second absorber so that landfill gas can be readily conveyed from one absorber to the other.

Another object of some embodiments is to maintain a first absorber and second absorber at a much greater pressure (preferably over 5 times as great) than a third absorber so that contaminants can be readily absorbed from the landfill gas in the first and second absorbers, and relatively low pressure $CO_2$ can be used to absorb trace contaminants from a solvent.

Another object of some embodiments is to convey solvent through two absorbers at substantially the same flow rate so as to balance the flow between the two.

Another object of some embodiments is to circulate solvent through one absorber at a flow rate that is much greater (preferably at least 10 times as great) than the flow rate of solvent through another absorber so that the flow rates are appropriate for removing $CO_2$ and trace contaminants from a landfill gas.

Another object of some embodiments is to responsibly exhaust $CO_2$ at a temperature of at least 1400° F. to ensure complete combustion of the trace contaminants such as chlorinated hydrocarbons and aromatics.

Another object of some embodiments is to control the flow of liquid solvent through a series of three flash tanks in such a way as to create a liquid gas barrier between adjacent flash tanks and to avoid starving a downstream solvent pump.

Another object of some embodiments is to install a control valve and a solvent pump between two absorbers, wherein the valve is controlled to maintain a predetermined liquid level in one of the absorbers, and the pump in conjunction with the valve helps maintain a substantial pressure differential between the two absorbers.

One or more of these and/or other objects of the invention are provided by a method of using a triple-effect absorption system that includes three absorbers and a flash system.

DESCRIPTION OF THE PREFERRED EMBODIMENT

Figure 1:
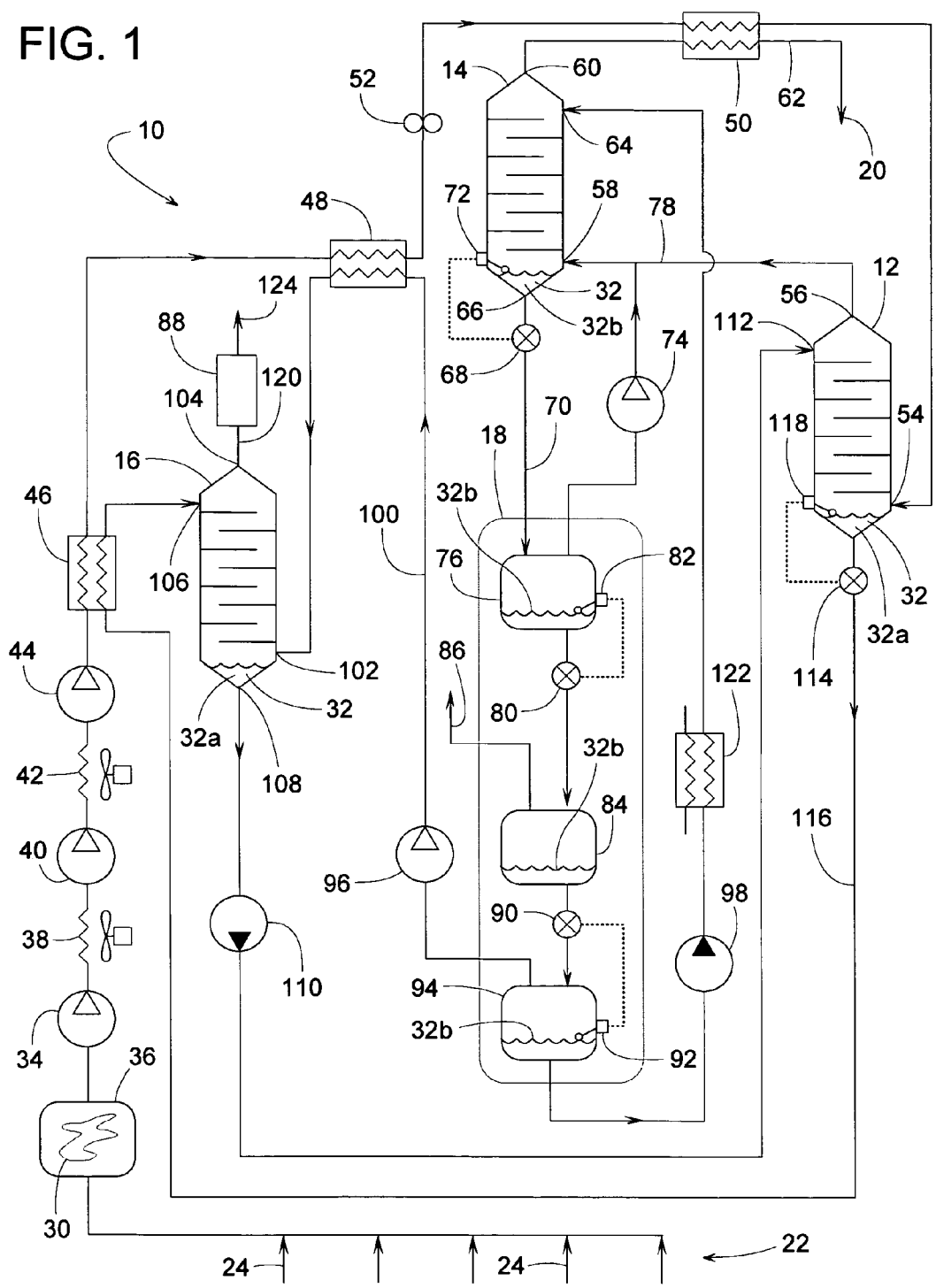
FIG. 1 is a schematic diagram of a triple-effect absorption system that illustrates a method of processing landfill gas to recover methane.

Referring to FIG. 1, a triple-effect absorption system 10 includes a first absorber 12, a second absorber 14, a third absorber 16, plus a flash system 18 that work together to recover relatively clean methane gas 20 from a landfill 22. Landfill 22 is a large field of buried garbage with a series of wells 24 that tap a landfill gas 30 generated by the decomposing garbage. Landfill gas 30 may be comprised of methane contaminated with various impurities such as $CO_2$ (carbon dioxide), chlorinated hydrocarbons, $H_2S$ (hydrogen sulfide), aromatics and water. Each impurity's concentration may vary from its intitial level in the landfill down to zero as gas 30 is progressively processed through system 10.

To recover and separate the methane from its contaminants, a solvent 32 having an affinity for contaminants is circulated through absorbers 12, 14 and 16. In first absorber 12, solvent 32 absorbs trace contaminants of chlorinated hydrocarbons, aromatics and water from landfill gas 30. In second absorber 14, solvent 32 absorbs $CO_2$ from gas 30. And in third absorber 16, $CO_2$ absorbs trace contaminants from solvent 32. Solvent 32 represents any chemical that can absorb and subsequently release one or more impurities that can contaminate methane gas. Examples of solvent 32 include, but are not limited to, SELEXOL (registered trademark of Union Carbide Chemicals & Plastics Technology Corporation of The Dow Chemical Company) and DEPG (diethylpropylene glycol). System 10 has two charges of solvent 32. A first portion 32a of solvent 32 circulates between absorbers 12 and 16, and a second, much larger portion 32b of solvent 32 circulates between absorber 14 and flash system 18.

In operation, a blower 34 draws landfill gas 30 up from within wells 24 into a collection tank 36. Blower 34 operates at an absolute suction pressure of about 310-inch water head (subatmospheric pressure) and a discharge pressure of about 3 psig. A cooler 38 reduces the temperature of gas 30 from about 160° F. to about 100° F. A screw compressor 40 takes the temperature and pressure of gas 30 to about 230° F. and 85 psig. A cooler 42 reduces the temperature of gas 30 to about 110° F. A reciprocating compressor 44 increases the pressure of gas 30 to about 450 psig. A solvent heat exchanger 46, a $CO_2$ heat exchanger 48, and a methane heat exchanger 50 each extracts waste heat from compressed gas 30 to enhance the effectiveness of system 10. A conventional sulfur treater 52 can be used to help extract at least some hydrogen sulfide from gas 30.

Gas 30 enters a lower gas inlet 54 of absorber 12 at about 75° F. and 450 psig, travels upward through absorber 12, and exits through an upper gas outlet 56 of absorber 12 at about 450 psig. As gas 30 travels through first absorber 12, first solvent portion 32a travels downward in intimate contact with gas 30 to absorb trace contaminants from gas 30. With some of the trace contaminants removed, gas 30 enters a lower gas inlet 58 of second absorber 14 at about 125° F. and 450 psig. Gas 30 leaving absorber 12 is comprised of about 42% $CO_2$.

To remove the $CO_2$ from gas 30, the gas travels upward from lower gas inlet 58 to an upper gas outlet 60 to release the $CO_2$ to second solvent portion 32b, which travels downward in intimate, $CO_2$-absorbing contact with gas 30. With most of the $CO_2$ now removed from gas 30, the gas is conveyed to a supply line 62 where the treated gas 20 can be delivered to wherever it may be needed. Prior to reaching supply line 62, however, gas 20 leaving second absorber 14 first passes through heat exchanger 50 to precool gas 30 that is about to enter lower gas inlet 54 of first absorber 12. Precooling gas 30 prior to it entering first absorber 12 promotes the absorption of trace contaminants into the high $CO_2$ gas stream.

Second solvent portion 32b, which absorbs. $CO_2$ from gas 30 in second absorber 14, travels downward from an upper liquid inlet 64 to collect just above a lower liquid outlet 66. The second solvent portion 32b is at about 50 to 55° F. A control valve 68 in a solvent line 70 (second solvent line) responds to a liquid level sensor 72 to maintain a predetermined head of liquid solvent 32b at the bottom of second absorber 14. Valve 68 controllably releases solvent 32b at about 450 psig in second absorber 14 to first flash tank 76 at about 250 psig. The lower pressure in first flash tank 76 causes $CO_2$ to be released from the second solvent portion 32b. Compressor 74 returns this $CO_2$ along with some methane to a gas line 78 to mix with gas 30 from first absorber 12. Together, gas line 78 and compressor 74 feed second absorber 14 with gas 30 that is about 45% $CO_2$.

The second solvent portion 32b pools at the bottom of first flash tank 76. A control valve 80 (first control valve) responsive to a liquid level sensor 82 controls the liquid level in first flash tank 76 and controllably feeds second solvent portion 32b into a second flash tank 84, which is slightly above atmospheric pressure. The pressure drop from flash tank 76 to flash tank 84 causes more $CO_2$ to escape from the second solvent portion 32b. That $CO_2$ is surplus, as it is not needed for stripping trace contaminants from the first solvent portion 32a in third absorber 16, thus that portion of the $CO_2$ can be directly vented to atmosphere via a vent line 86. If that $CO_2$ were not vented to atmosphere but instead directed into third absorber 16, the surplus $CO_2$ would create an unnecessary incineration load on an incinerator 88, which will be explained later.

Another control valve 90 (second control valve) responsive to a liquid level sensor 92 in a downstream third flash vessel 94 controls the liquid level in third flash tank 94 and controllably feeds the second solvent portion 32b into third flash tank 94. A compressor 96 maintains third flash tank 94 at about a 4 to 5 psia (negative gage pressure of about −9 to −10 psig), which cause additional $CO_2$ to escape from the second solvent portion 32b. This additional $CO_2$ is later used in third absorber 16 to remove the trace contaminants from first solvent portion 32a. A pump 98 draws the liquid second portion 32b of solvent 32 from the bottom of flash tank 94 and returns it to upper liquid inlet 60 of second absorber 14 to drive the solvent cycle of second absorber 14 and flash system 18.

To strip the trace contaminants from the first portion 32a of solvent 32, compressor 96 draws $CO_2$ from third flash tank 94, and a $CO_2$ line 100 and heat exchanger 48 convey the $CO_2$ into a lower gas inlet 102 of third absorber 16. Vent line 86 represent a first flow path, and $CO_2$ line 100 represents a second flow path for the $CO_2$. With two flow paths, only a minimal amount of $CO_2$ is used for stripping trace contaminants from first portion 32a of solvent 32 in third absorber 16, and surplus $CO_2$ can be vented directly to atmosphere.

In some cases, heat exchanger 48 heats the $CO_2$ before the $CO_2$ enters third absorber 16. Once inside third absorber 16, the $CO_2$ travels upward to an upper gas outlet 104. At the same time, the first solvent portion 32a with absorbed trace contaminants travels from an upper liquid inlet 106 in third absorber 16 down to a lower liquid outlet 108. As this first solvent portion 32a and the $CO_2$ travel in intimate contact with each other inside third absorber 16, the $CO_2$ strips the contaminants from the first solvent portion 32a.

The resulting relatively uncontaminated first solvent portion 32a collects at the bottom of third absorber 16. A pump 110 returns the clean first solvent portion 32a to an upper gas inlet 112 of absorber 12 so that the first solvent portion 32a can absorb additional trace contaminants from the incoming landfill gas 30.

To maintain first solvent portion 32a at a certain liquid level at the bottom of first absorber 12, a control valve 114 in a first solvent line 116 responds to a liquid level sensor 118, thereby controlling the delivery of first solvent portion 32a to third absorber 16 and maintaining a predetermined pressure differential between absorbers 12 and 16. The pressure differential is about 450 psig and it is that pressure that forces first solvent portion 32a to upper liquid inlet 106 of third absorber 16.

Before entering third absorber 16, first solvent portion 32a is heated by gas 30 within heat exchanger 46. Heating first solvent portion 32a enables the $CO_2$ in third absorber 16 to more readily strip the trace contaminants from the first solvent portion 32a, thus less $CO_2$ is needed for absorbing the contaminants.

After absorbing the trace contaminants from first solvent portion 32a, the $CO_2$ and trace contaminants exhaust out through an upper gas outlet 120 of third absorber 16 and enter incinerator 88. Using the trace contaminants and treated gas 20 as fuel, incinerator 88 heats the $CO_2$ (from $CO_2$ line 100) to at least 1400° F. before exhausting the $CO_2$ and the resulting combustion products to atmosphere 124. By venting a portion of the $CO_2$ through vent line 86, as opposed to directing all of the $CO_2$ into third absorber 16, less energy is needed to heat the contaminated $CO_2$ to 1400° F., thus the trace contaminants can provide all or at least most of the necessary combustion energy.

To effectively strip the $CO_2$ from the second solvent portion 32b and supply third absorber 16 with a sufficient amount of $CO_2$ to thoroughly strip the first solvent portion 32a of its absorbed trace contaminants yet limit the amount of $CO_2$ delivered to third absorber 16 so as not to extinguish or dampen the combustion within incinerator 88, the relative fluid flow rates, temperatures and pressures of system 10 need to be properly balanced. In a currently preferred embodiment, for example, the pressure in first absorber 12 is nearly equal to or at least within 10% of the pressure in second absorber 14, the pressure in first absorber 12 and second absorber 14 are much greater than and preferably over 5 times as great as the pressure in third absorber 16, the flow rate of solvent 32 in first absorber 12 and third absorber 16 are substantially equal or at least within 10% of each other, the flow rate of solvent 32 through second absorber 14 is much greater than and preferably at least 10 times as great as the flow rate of solvent through first absorber 12, and the flow rate of solvent 32 through second absorber 14 is much greater than and preferably at least 10 times as great as the flow rate of solvent through third absorber 16. In some cases, the first solvent portion 32a flows at about 10 gpm, and the second solvent portion 32b flows at about 210 gpm.

The pressure inside first absorber 12 is approximately 450 psig, thus the pressure of gas 30 inside first absorber 12 and the pressure of solvent 30 inside first absorber 12 are also at about 450 psig. The pressure inside second absorber 14 is approximately 450 psig, thus the pressure of gas 30 inside second absorber 14 and the pressure of solvent 30 inside second absorber 14 are also at about 450 psig. The pressure inside third absorber 16 is near zero psig, thus the pressure of gas 30 inside third absorber 16 and the pressure of solvent 30 inside third absorber 16 are also at about zero psig.

A refrigerated or otherwise cooled heat exchanger 122 can be added to cool the second solvent portion 32b circulated through second absorber 14. Such cooling increases the second portion's ability to absorb $CO_2$ inside second absorber 14. In a currently preferred embodiment, the second solvent portion 32b entering second absorber 14 is naturally cooled to a temperature of about 40 to 50° F. As for the other heat exchangers of system 10, the heat supplied to heat exchangers 46, 48 and 50 would otherwise be wasted heat created directly or indirectly by compressors 34, 40 and/or 44. It should be noted that any one or more of heat exchangers 38, 42, 46, 48, 50, and 122 may be optionally omitted.

Although the invention is described with reference to a preferred embodiment, it should be appreciated by those of ordinary skill in the art that various modifications are well within the scope of the invention. Therefore, the scope of the invention is to be determined by reference to the following claims.

The invention claimed is:

1. A triple-effect absorption system for processing a gas from a landfill, wherein the gas includes varying concentrations of methane, $CO_2$, water, and combustible contaminants, the triple-effect absorption system comprising:
   a solvent comprising a first portion and a second portion;
   a first absorber conveying the first portion of the solvent at a first flow rate at a first pressure;
   a second absorber conveying the second portion of the solvent at a second flow rate at a second pressure;
   a third absorber conveying the first portion of the solvent at a third flow rate at a third pressure, wherein the combustible contaminants separate from the first portion of the solvent in the third absorber;
   an incinerator connected in fluid communication with the third absorber to receive the $CO_2$ and the combustible contaminants, the combustible contaminants burn in the incinerator to heat the $CO_2$;
   a flash system for separating $CO_2$ from the second portion of the solvent;
   a first solvent line extending between the first absorber and the third absorber for conveying the first portion of the solvent from the first absorber to the third absorber;
   a second solvent line extending between the second absorber and the flash system for conveying $CO_2$ and the second portion of the solvent from the second absorber to the flash system;
   a gas line extending between the first absorber and the second absorber for conveying the gas from the first absorber to the second absorber;
   a $CO_2$ line extending between the flash system and the third absorber, wherein the following conditions exist:
   a) the $CO_2$ line helps deliver $CO_2$ from the flash system to the third absorber to place the $CO_2$ and the first portion of the solvent in the third absorber in intimate contact with each other;
   b) the first pressure and the second pressure are within 10-percent of each other, yet the second flow rate is over 10 times greater than the first flow rate; and
   c) the first flow rate and the third flow rate are within 10-percent of each other, yet the first pressure is over 5 times greater than the third pressure: and
   a heat exchanger in fluid communication with the $CO_2$ line to help convey the $CO_2$ from flash system to the third absorber and to preheat the $CO_2$ before the $CO_2$ enters the third absorber.

2. The triple-effect absorption system of claim 1, further comprising a compressor that generates heat upon compressing the gas from the landfill, wherein the heat transfers to the heat exchanger to preheat the $CO_2$.

3. The triple-effect absorption system of claim 1, further comprising a vent line in fluid communication with the flash system, wherein at least some of the $CO_2$ from the flash system bypasses the third absorber and travels through the vent line to be released to atmosphere.

4. The triple-effect absorption system of claim 1, wherein the first absorber contains a liquid level, and the triple-effect absorption system further comprises a valve and a liquid level sensor, the valve is on the first solvent line and is responsive to the liquid level sensor which senses the liquid level in the first absorber, the valve responds to the liquid level sensor to help control the liquid level in the first absorber and help maintain the first pressure greater than the third pressure.

5. The triple-effect absorption system of claim 1, wherein, the first flow rate substantially equals the third flow rate.

6. A triple-effect absorption method that employs a solvent for processing a gas from a landfill, wherein the gas includes varying concentrations of methane, $CO_2$, and combustible contaminants, the triple-effect absorption method comprising:
   pumping a first portion of the solvent at a first flow rate;
   pumping a second portion of the solvent at a second flow rate, wherein the second flow rate is greater than the first flow rate;
   releasing the combustible contaminants from the gas to the first portion of the solvent while the first portion of the solvent is at a first pressure;

releasing the CO₂ from the gas to a second portion of the solvent while the second portion of the solvent is at a second pressure;

separating the CO₂ from the second portion of the solvent;

directing the CO₂ from the second portion of the solvent into intimate contact with the first portion of the solvent such that the CO₂ absorbs the combustible contaminants from the first portion of the solvent while the first portion of the solvent is at a third pressure;

preheating the CO₂ before directing the CO₂ into intimate contact with the first portion of the solvent; and after the CO₂ absorbs the combustible contaminants from the first portion of the solvent, using the combustible contaminants to help further heat the CO₂ to a temperature of at least 1,400 degrees Fahrenheit.

7. The triple-effect absorption method of claim 6, further comprising:

compressing the gas from the landfill prior to releasing the combustible contaminants from the gas to the first portion of the solvent;

generating heat upon compressing the gas; and transferring the heat to the CO₂ as a way of preheating the CO₂ before directing the CO₂ into intimate contact with the first portion of the solvent.

8. The triple-effect absorption method of claim 6, further comprising: venting to atmosphere at least some of the CO₂ from the second portion of the solvent, thereby reducing an amount of CO₂ that is directed into intimate contact with the first portion of solvent.

9. The triple-effect absorption method of claim 6, wherein the second flow rate is at least 10 times greater than the first flow rate.

10. The triple-effect absorption method of claim 6, wherein the first pressure and the second pressure are within 10 percent of each other.

11. The triple-effect absorption method of claim 6, wherein the first pressure and the second pressure are at least 5 times greater than the third pressure.

12. A triple-effect absorption method that employs a solvent for processing a gas from a landfill, wherein the gas includes varying concentrations of methane, CO₂, and combustible contaminants, the triple-effect absorption method comprising:

pumping a first portion of the solvent at a first flow rate;

pumping a second portion of the solvent at a second flow rate, wherein the second flow rate is greater than the first flow rate;

releasing the combustible contaminants from the gas to the first portion of the solvent while the first portion of the solvent is at a first pressure;

releasing the CO₂ from the gas to a second portion of the solvent while the second portion of the solvent is at a second pressure;

separating the CO₂ from the second portion of the solvent;

directing the CO₂ from the second portion of the solvent into a first flow path and a second flow path;

venting the CO₂ from the first flow path, to atmosphere;

directing the CO₂ from the second flow path into intimate contact with the first portion of the solvent such that the CO₂ absorbs the combustible contaminants from the first portion of the solvent while the first portion of solvent is at a third pressure; and using the combustible contaminants to help heat the CO₂ from the second flow path to a temperature of at least 1,400 degrees Fahrenheit.

13. The triple-effect absorption method of claim 12, wherein the second flow rate is at least 10 times greater than the first flow rate.

14. The triple-effect absorption method of claim 12, wherein the first pressure and the second pressure are within 10 percent of each other.

15. The triple-effect absorption method of claim 12, wherein the first pressure and the second pressure are at least 5 times greater than the third pressure.

16. The triple-effect absorption method of claim 12, further comprising heating the CO₂ coming from the second flow path.

17. The triple-effect absorption method of claim 15, further comprising:

compressing the gas from the landfill prior to releasing the combustible contaminants from the gas to the first portion of the solvent;

generating heat upon compressing the gas; and transferring the heat to the CO₂ as a way heating the CO₂ in the second flow path.

18. A triple-effect absorption system for processing a gas from a landfill, wherein the gas includes varying concentrations of methane, CO₂, water, and combustible contaminants, the triple-effect absorption system comprising:

a solvent comprising a first portion and a second portion;

a first absorber conveying the first portion of the solvent at a first flow rate at a first pressure;

a second absorber conveying the second portion of the solvent at a second flow rate at a second pressure;

a third absorber conveying the first portion of the solvent at a third flow rate at a third pressure;

a flash system for separating CO₂ from the second portion of the solvent;

a first solvent line extending between the first absorber and the third absorber for conveying the first portion of the solvent from the first absorber to the third absorber;

a second solvent line extending between the second absorber and the flash system for conveying CO₂ and the second portion of the solvent from the second absorber to the flash system;

a gas line extending between the first absorber and the second absorber for conveying the gas from the first absorber to the second absorber;

a CO₂ line extending between the flash system and the third absorber, wherein the following conditions exist:

a) the CO₂ line helps deliver CO₂ from the flash system to the third absorber to place the CO₂ and the first portion of the solvent in the third absorber in intimate contact with each other;

b) the first pressure and the second pressure are within 10-percent of each other, yet the second flow rate is over 10 times greater than the first flow rate; and c) the first flow rate and the third flow rate are within 10-percent of each other, yet the first pressure is over 5 times greater than the third pressure;

a first flash tank having a first liquid level;

a second flash tank having a second liquid level;

a third flash tank having a third liquid level;

a first control valve responsive to the first liquid level; and a second control valve responsive to the third liquid level, wherein the first control valve is downstream of the first flash tank and upstream of the second flash tank with respect to the second portion of the solvent flowing from the first flash tank to the second flash tank, and the second control valve is downstream of the second flash tank and upstream of the third flash tank with respect to the second portion of the solvent flowing from the second flash tank to the third flash tank.

\* \* \* \* \*